United States Patent [19]

Rieder

[11] Patent Number: 4,873,060
[45] Date of Patent: Oct. 10, 1989

[54] PROCESS FOR THE PREPARATION OF AROMATIC POLYESTERS AND APPARATUS FOR CARRYING OUT THIS PROCESS

[75] Inventor: Werner Rieder, Vienna, Austria

[73] Assignee: Minnesota Mining and Manufacturing Company, St. Paul, Minn.

[21] Appl. No.: 508,723

[22] Filed: Jun. 28, 1983

Related U.S. Application Data

[62] Division of Ser. No. 342,007, filed as PCT AT 81/00016 on Jun. 26, 1981, published as WO82/00149 on Jan. 21, 1982, Pat. No. 4,401,803.

[30] Foreign Application Priority Data

Jun. 26, 1980 [AT] Austria .................................. 3344/80

[51] Int. Cl.$^4$ .......................... B01F 7/22; B01J 19/18; C08F 2/00
[52] U.S. Cl. .................................... 422/135; 422/225; 422/234; 526/66; 528/179; 528/193; 528/194
[58] Field of Search ............... 422/132, 135, 225, 234, 422/228; 528/176, 179–182, 193, 194; 526/65, 66

[56] References Cited

U.S. PATENT DOCUMENTS

| | | | |
|---|---|---|---|
| 2,880,076 | 3/1959 | Kircher et al. | 422/132 |
| 3,010,804 | 11/1961 | Wistrich et al. | 422/228 |
| 3,013,866 | 12/1961 | Samaniego et al. | 422/228 |
| 3,307,792 | 3/1967 | Hughes et al. | 366/303 |
| 4,157,427 | 6/1979 | Ferber | 422/135 X |

Primary Examiner—Barry S. Richman
Assistant Examiner—Jill Johnston
Attorney, Agent, or Firm—Bierman and Muserlian

[57] ABSTRACT

In a process for the preparation of aromatic polyesters by polycondensation of diphenols with chlorides of aromatic dicarboxylic acids by the two-phase interfacial polycondensation process, in which a dispersion as the reaction mixture is prepared from an aqueous phase, which contains the diphenolate formed with the aid of alkali metal hydroxide, and an organic-liquid phase containing the acid chlorides, this dispersion is passed, in the apparatus which is intended for carrying out the process and which comprises a reaction kettle and a dispersing device included with the latter in a circulation, through the dispersing device and the reaction kettle, the acid chloride dissolved in a largely anhydrous chlorinated solvent being continuously fed into this circulation at a point which, in the direction of flow, is upstream of the dispersing device.

1 Claim, 1 Drawing Sheet

U.S. Patent
Oct. 10, 1989
4,873,060
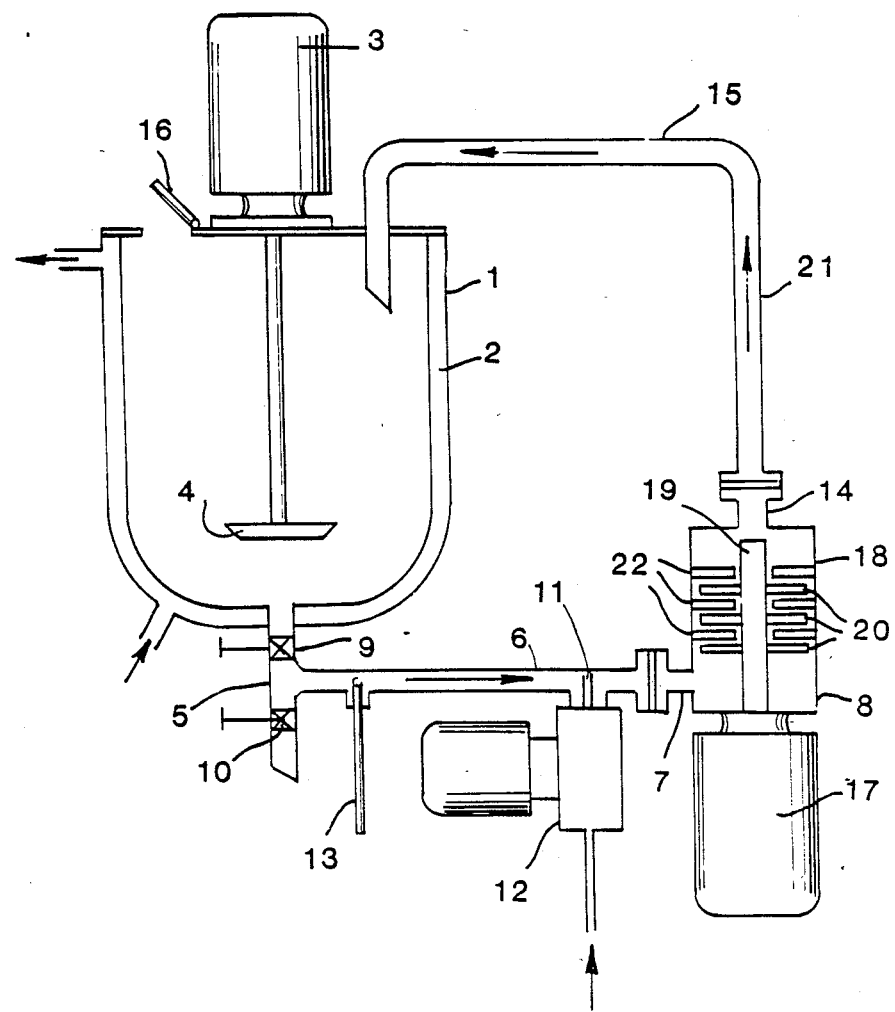

PROCESS FOR THE PREPARATION OF AROMATIC POLYESTERS AND APPARATUS FOR CARRYING OUT THIS PROCESS

PRIOR APPLICATION

This application is a division of my U.S. patent application Ser. No. 342,007, filed as PCT at 81/00016 on Jan. 26, 1981, published as WO82/00149 on Jan. 21, 1982, now U.S. Pat. No. 4,401,803.

TECHNICAL FIELD

The invention relates to a process for the preparation of aromatic polyesters by polycondensation of diphenols with chlorides of aromatic dicarboxylic acids, such as isophthalic acid and/or terephthalic acid, according to the two-phase interfacial polycondensation process, and to an apparatus for carrying out this process.

STATE OF THE ART

In a two-phase interfacial polycondensation process described in U.S. Pat. No. 3,216,970, a fine dispersion is prepared from the aqueous phase composed of a solution of the diphenol, alkali metal hydroxide in the stoichiometric ratio or in a slight excess in order to form the diphenolate and a phase transfer catalyst in water and, if appropriate, an organic solvent as a solubilizer with the organic-liquid phase composed of a solution of the acid chloride in a chlorinated solvent, the diphenolate which has been transferred into the organic-liquid phase with the aid of the phase transfer catalyst undergoing a polycondensation reaction with the acid chloride to form the polyester and the resulting polyester being dissolved in the organic phase. In the examples described in this U.S. patent specification, the viscosity reached by the synthesized polyesters is rather low. This is the case especially if these are polyesters, for the synthesis of which diphenolates are used which have a cenral carbon atom of such a type that free rotation of the groups bonded to this carbon atom is hindered.

DESCRIPTION OF THE INVENTION

It is now the object of the invention to indicate a process for the preparation of polyesters of the above-mentioned type, wherein under otherwise identical conditions a higher intrinsic viscosity of the synthesized polyester is obtained than in the known processes.

The object of the invention is achieved, according to the invention, by a process which comprises circulating the reaction mixture, which is prepared as a dispersion of the aqueous phase and of the organic-liquid phase, through a dispersing device and continuously introducing the acid chloride, which is to be fed in and which is dissolved in a largely anhydrous chlorinated solvent, into this circulation at a point which, in the direction of flow, is upstream of the dispersing device. In this process, it is advantageous to prepare a dispersion from the aqueous phase to be fed in and a part quantity of the solvent to be fed in, of the organic-liquid phase, and to maintain this dispersion into which the acid chloride solution to be fed in is then introduced. The part quantity of the solvent, to be fed in, of the organic-liquid phase, which part quantity serves for preparing a dispersion of the reaction mixture, does not contain any acid chloride and—in contrast to the solvent used for dissolving the acid chloride to be introduced—therefore does not need to meet any stringent purity requirements, in particular with respect to being largely anhydrous.

According to an advantageous embodiment of the invention, the process according to the invention comprises, for preparing the dispersion from the aqueous phase and a part quantity of the chlorinated solvent to be fed in, of the organic-liquid phase, passing the mixture of these two components through the dispersing device.

According to another advantageous embodiment of the invention, the reaction mixture is passed in the dispersing device through one or more mixing stages in series, the mixture being divided in each mixing stage into several part streams, the flow boundaries of the part streams carrying out motions transversely to their main directions of flow at mean velocities greater than 5 m/second and the part streams passing to a mixing chamber which is provided with at least one outlet channel and in which the kinetic energy of the mixture is reduced to a value which is low compared with its maximum value, the zones of the mixture flowing in the mixing chamber being subjected to flow conditions which vary in an at least almost periodic manner.

It is also an object of the invention to indicate an advantageous apparatus for carrying out the process according to the invention.

This object is achieved by the apparatus according to the invention, which comprises a reaction kettle with an agitator, a dispersing device, the inlet and outlet of which are each connected to the reaction kettle via a pipe, and a device, inserted in the pipe leading from the reaction kettle to the inlet of the dispersing device, for the addition of the acid chloride.

DESCRIPTION OF THE DRAWING

The apparatus for carrying out the polycondensation has a kettle 1 with a cooling jacket 2, and an agitator consisting of a high-speed motor 3 and a turbine stirrer 4. A pipe nozzle 5 leads away from the bottom of the kettle, and a pipe 6, which leads to the inlet 7 of a dispersing device 8, branches off this pipe nozzle 5 in which isolation valves 9 and 10 are located on either side of this branch. A device 11 with a metering pump 12 for the metered feed of a reaction component and a thermometer 13 are also inserted into this pipe 6. The outlet 14 of the dispersing device 8 is connected via a further pipe 15 to the interior of the kettle. A charging orifice 16 which can be closed is located in the lid of the kettle.

The dispersing device 8 is provided with a shaft 19 which is driven by a motor 17 and mounted in a casing 18 and on which three rotor discs 20 provided with radial slots are seated. Associated with each rotor disc 20—downstream in the direction of flow 21—a stationary disc 22 joined to the wall of the casing and provided with radial slots is provided in such a way that each rotor disc 20 together with its downstream stationary disc 22 produces a mixing stage.

BEST METHOD FOR CARRYING OUT THE INVENTION

EXAMPLE 1

In a heatable vessel, 4.0 moles (1,160 g) of 1,1-bis-(4-hydroxyphenyl)-1-phenylethane (melting point: 189°–191° C.) are dissolved by warming in 8 l of water and 2 l of isopropanol together with 8.3 moles (322 g) of sodium hydroxide, to give the aqueous phase which is to be fed in.

After the solution has cooled down again, it is then introduced into the kettle 1 of the apparatus described in the drawing, 10 l of distilled 1,2-dichloroethane are added to this solution and finally, after the isolation valve 9 has been opened, the agitator, the dispersing device 8 and the water cooling in the cooling jacket 2 are switched on. Because of its pumping action, the dispersing device 8 maintains a steady flow, in the direction 21, of the liquid mixture fed in. After about 2 minutes, the liquid mixture fed in has been converted into a fine dispersion by the action of the agitator and the dispersing device 8.

0.2 mole (46 g) of benzyltriethylammonium chloride dissolved in 300 ml of water is then added as a phase transfer catalyst to this dispersion and shortly afterwards—while the agitator and dispersing device 8 remain switched on—a solution of 2.0 moles (406 g) of isophthalic acid dichloride and 2.0 moles (406 g) of terephthalic acid dichloride in 2 l of 1,2-dichloroethane, which has been made absolutely anhydrous, are continuously introduced in the course of 60 minutes via the feed device 11 by means of the metering pump 12 and, finally, the agitator and the dispersing device are allowed to continue to run for a further 60 minutes as a final reaction period, the temperature of the dispersion being maintained below 25° C. by cooling and being continuously monitored by means of the thermometer 23.

The polycondensation reaction is thus completed and the polyester formed is dissolved in the organicliquid phase.

By opening the isolation valve 10, the dispersion is then drained from the apparatus into a separation vessel in which the two phases separate within a relatively short time. The polyester solution forming the organicliquid phase is then separated off and thoroughly washed with water in order to remove ionic constituents. The polyester is then precipitated from this solution by adding isopropanol and is filtered off, and ionic impurities which may perhaps still be present are removed from the polyester by washing with isopropanol, water and again with isopropanol. Subsequently, the polymer is dried to constant weight in a vacuum drying cabinet at 80° C.

This gives 1,586 g (that is to say 94.4% of the theoretically possible quantity) of a colorless, halogen-free polyester having an intrinsic viscosity of 1.84 dl/g.

The intrinsic viscosity is determined at 30° C. on a solution of 0.5 g of polymer in 100 ml of solvent (60% of phenol and 40% of tetrachloroethane) with the aid of an Ubbelohde viscometer (capillary constant 0.01).

The effectiveness of the dispersing device 8 results from the fact that, in each mixing stage, a liquid mixture consisting of two immiscible liquid phases and passing through this stage is raised during its passage through the radial slots of the rotating rotor disc 20 to velocities, of which the components which are perpendicular to the direction of the axis have magnitudes of more than 5 m/second. In the space between the rotor disc 30 and the associated downstream stationary disc 22, which space forms the mixing chamber, the kinetic energy of the liquid mixture is abruptly brought to a very low value, before it leaves the mixing chamber through the radial slots in the stationary disc 22, the zones of the mixture flowing in the mixing chamber being subjected to flow conditions which vary in an at least almost periodic manner. As result, very intense turbulence is generated in the mixing chamber, and this effects the formation or improvement of a very fine dispersion in the liquid mixture.

EXAMPLE 2

To prepare the aqueous phase, 2.0 moles (700 g) of 9,9-bis-(4-hydroxyphenyl)-fluorene (melting range: 227°–229° C.) are dissolved by gentle warming in 4 l of water and 2 l of dioxane together with 4.15 moles (166 g) of sodium hydroxide, in a manner similar to that indicated in Example 1. The solution, after it has cooled again, is introduced into the kettle 1, and 7 l of distilled 1,2-dichloroethane are added to the solution. Subsequently—always analogously to the description in Example 1—the liquid mixture fed in is converted into a fine dispersion, 0.1 mole (23 g) of benzyltriethylammonium chloride dissolved in 100 ml of water is added as a phase transfer catalyst, a solution of 1 mole (203 g) of isophthalic acid dichloride and 1 mole (203 g) of terephthalic acid dichloride in 1 l of 1,2-dichloroethane, which has been made absolutely anhydrous, is added continuously in the course of 30 minutes via the feed device 11, and the mixture is subjected to a final reaction for a further 30 minutes.

As described in Example 1, the organic-liquid phase is then separated off from the dispersion which has been drained from the apparatus and in which the polyester formed is dissolved in the organic-liquid phase, and is washed and, finally, the polyester is precipitated, with vigorous stirring, from the organic-liquid phase by slowly adding acetone and methanol. This polyester is filtered off and any ionic impurities which may still be present are removed from the polyester by washing with ethanol, water and once more with ethanol. Subsequently, the polymer is dried to constant weight in a vacuum drying cabinet at 80° C.

This gives 900 g (that is to say 94% of the theoretically possible) of a colorless, halogen-free polyester having an intrinsic viscosity of 1.67 dl/g (determined by the measurement method indicated in Example 1).

Commercial applicability

Highly heat-resistant aromatic polyesters having a high molecular weight can be synthesized by the process according to the invention, in particular when the apparatus according to the invention is used; these polyesters are used, for example, for the manufacture of films cast from solution or for the manufacture of films, sheets or components produced by extrusion or injection-molding from the melt, and these can be used especially also for electrical insulation purposes in many cases where a high long-term heat resistance is required.

Further important applications are in fields where a high oxygen index of the plastic is required. In fact, a high oxygen index of plastics is increasingly demanded especially in those applications where, in the case of a thermal decomposition of the plastic used, such as can occur during a failure or accident, and in particular also in the case of fire, the evolution of smoke and the toxicity of the decomposition products formed should be as low as possible.

I claim:

1. An apparatus for polycondensation of diphenols and aromatic dicarboxylic acid halides comprising a reactor provided with a stirring means and connected to a dispersing means by a feed means and a recycle means, said dispersing means comprising means defining a plurality of mixing stages in series to be passed by a liquid reaction mixture fed to the dispersing means via the recycle means, whereby in each mixing stage there are means for dividing the reaction mixture into several streams, the flow boundaries of the streams thereby carrying out motions transversely to the main direction of the reaction-mixture-flow at mean velocities greater than 5 m/second and mixing chamber means with at least one outlet channel, the apparatus further comprising means for introducing a solution of aromatic dicarboxylic acid halide in an organic solvent into the recycle means before entry into the dispersing means.

* * * * *